United States Patent Office 2,706,194
Patented Apr. 12, 1955

2,706,194

ESTERS OF PHOSPHONIC ACIDS

Rupert C. Morris and Forrest J. Watson, Berkeley, Calif., assignors to Shell Development Company, Emeryville, Calif., a corporation of Delaware No Drawing. Application May 14, 1951,
Serial No. 226,282

2 Claims. (Cl. 260—247)

This invention relates to new organic compounds containing phosphorus. More particularly, the present invention relates to certain new esters of phosphonic acids as new compositions of matter and to compositions containing the same.

The new compounds that are provided by this invention are the esters of primary and of secondary phosphonic acids, which esters conform in structure to formula

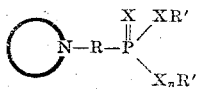

in which R is a divalent essentially aliphatic hydrocarbon radical, each XR' is the residue of an alcohol or a phenol, denoted by R'XH, $n$ is 0 or 1, and the group represented as

consists essentially of a heterocyclic ring containing carbon and nitrogen having from 5 to 6 ring atoms, bonded to the radical R by a bond from nitrogen in said heterocyclic ring. Each X is an atom of a non-metallic element of the chalcogen family of the elements, particularly one having an atomic number that is an integral multiple of 8, i. e., oxygen or sulfur, and especially oxygen. The divalent essentially aliphatic hydrocarbon radical represented by R preferably is an alkylene radical containing from one to ten carbon atoms, and it most desirably is an alkylene radical containing from two to six carbon atoms. The radicals represented by XR' preferably are residues of an aliphatic alcohol. They include representation of interconnected alkylene radicals that form the divalent residue XR'—R'X of a dihydric aliphatic alcohol, e. g., glycol, propylene glycol, glycerol monomethyl ether, etc., as well as the preferred residues of the monohydric aliphatic alcohols. The heterocyclic ring group or radical can be any nitrogen-heterocyclic ring whatsoever containing nitrogen and carbon and from five to six atoms in the ring, and may be illustrated by the morpholine ring, the piperidine ring, the $\Delta^3$-tetrahydropyridine ring, the pyrrolidine ring, the 1,4-diazine ring, the 1,3,5-triazine ring, the 1,4-thiazine, or thiamorpholine ring, and their various analogs and substitution products.

The compounds of this invention are prepared by treating N-haloalkyl derivatives of heterocyclic compounds containing carbon and nitrogen in the ring having 5 to 6 ring atoms, with sodium or other alkali metal salts of diesters of phosphorus acid and of monoesters of phosphonous acids. The N-haloalkyl derivatives of said heterocyclic compounds can be prepared in turn by known methods, e. g., by combining an alkylene halohydrin or a substituted alkylene halohydrin wherein only inert, or non-functional substituents are present, and the N-heterocyclic compound in the presence of an acid-sequestrant, or by directly combining by known procedures the N-heterocyclic compound with an alkylene oxide or an inertly-substituted alkylene oxide, and by treating the resulting N-alkylol derivative of the N-heterocyclic compound by known methods with thionyl chloride or equivalent reagent to substitute halogen for hydroxy. A typical example of these reactions is represented by the following synthesis of diethyl 2-(N-morpholino)ethanephosphonate, an illustrative ester of a primary phosphonic acid of this invention:

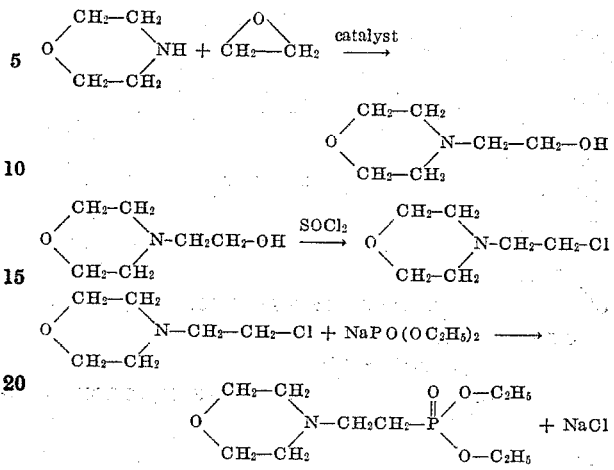

By employing, instead of morpholine and sodium diethyl phosphite, 2,5-dibutyl-1,4-diazine and sodium di-2-ethoxyethyl phosphite, and by taking into account, with regard to the amounts of the reactants used, the di-functionality of the heterocyclic reagent, there may be prepared the compound

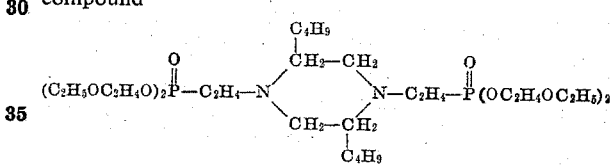

Similarly, from piperidine and pyrrolidine, respectively, and pentamethylene chlorohydrin and sodium diethyl trithiophosphite, there may be prepared the compounds of this invention that have the structures:

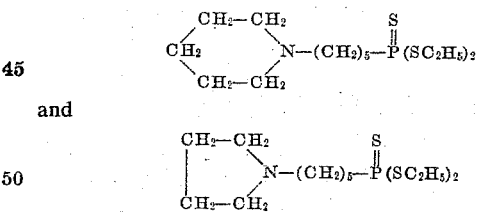

and

The synthesis of a typical ester of a secondary phosphonic acid according to the invention is illustrated by the preparation of butyl [2-(N-thiamorpholino)ethane]-benzenephosphonate, according to the following equation:

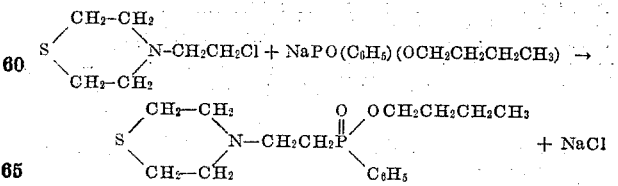

The reaction between the N-haloalkyl nitrogen-heterocyclic compound and the phosphorous or phosphonous acid derivative occurs readily when the said reactants are mixed, preferably in the presence of an inert solvent such as benzene, toluene, iso-octane, or other hydrocarbon, dibutyl ether, dioxane, tetrahydrofurane, or other ether, or chloroform, perfluorobutane, octyl chloride, chlorobenzene, or other halo-substituted hydrocarbon solvent, and the mixture is heated if desired to accelerate the reaction. The reactants generally are employed in the stoichiometric proportions, although other proportions can be used if desired. Temperatures of from about 25° C. to about 150° C. can be used, a preferred range being from about 40° C. up to about 100° C. When the reaction has gone to completion the inorganic salt formed in the reaction can be removed by filtration, centrifugation, or equivalent means, and the filtrate treated by more or less conventional methods, such as by fractional distillation, with selective solvents, with adsorbents, etc., to recover the reaction product in more pure state. Recovery of the reaction product in pure form is not always essential, however, since for some purposes it may be sufficiently pure as it exists in the reaction mixture, or in the crude form after removal of salt, solvent, and any unconsumed reactants from the reaction mixture. In such cases, recovery of the pure product from the reaction mixture may, of course, be dispensed with without departure from the invention.

A further method for the preparation of the novel compounds of this invention involves the reaction of a neutral ester of the phosphorous acid or of a phosphonous acid with an N-haloalkyl derivative of a nitrogen-heterocyclic compound of the class hereinbefore and hereinafter defined, according to the following illustrative equation:

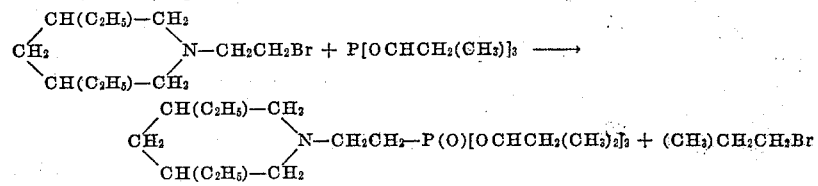

The reaction illustrated by this equation is effected by heating a mixture of the phosphorous or phosphonous ester and the N-haloalkyl nitrogen-heterocyclic compound to a temperature preferably within the range of from about 125° C. to about 175° C. for a period of from about 4 to about 16 hours, more or less. The reaction can be carried out under pressure, as in an autoclave, if the reaction temperature is above the boiling point of the reaction mixture at normal or atmospheric pressures. In appropriate cases, depending upon the boiling point of the constituents of the reaction mixture, the reaction can be carried out under atmospheric pressures, as in a vessel equipped with a reflux column whereby incidental loss by volatilization is minimized. Continuous withdrawal of the organic halide formed in the reaction, as by fractionating from the evolved vapors, favors enhanced yields of desired product. As in the practice of the first-described method, the product can be recovered from the reaction mixture by more or less conventional methods, such as fractional distillation, or purification of the product beyond that state in which it exists in the reaction mixture may be dispensed with either in whole or in part without departure from the invention.

The following example is presented in order to illustrate a suitable method by which compounds of this invention can be prepared. It will be appreciated that the example is presented with the intent of illustration and not of limitation upon the invention as the same is more broadly defined in the hereto appended claims.

*Example.*—N-(2-hydroxyethyl)morpholine (5 moles) was mixed with thionyl chloride (12.6 moles) in the presence of carbon tetrachloride as solvent at 0° C. The solution then was slowly warmed to the boiling point and refluxed for ten hours. The resulting slurry of amine salt in carbon tetrachloride was mixed with water and the amine liberated by addition of a small excess over the equivalent amount of sodium hydroxide. The N-(2-chloroethyl)-morpholine was recovered by extracting the neutralized solution with benzene and distilling. Two moles of the N-(2-chloroethyl)-morpholine then were added to a solution of sodium dibutyl phosphite (prepared by adding 2 moles of sodium to a solution of 2 moles of dibutyl phosphite in toluene) and the mixture was heated under a reflux column at about 110° C. for 10 hours. After removal of sodium chloride by filtration, dibutyl 2-(N-morpholino)ethanephosphonate was recovered by fractional distillation as a liquid distilling at about 127–129° C. under 0.1 millimeters of mercury pressure.

By the procedure that is illustrated in the foregoing example there can be prepared other phosphonic acid esters of this invention that conform in structure to the generic structural formula presented hereinbefore. Thus, from N-(3-chloropropyl)-piperidine and sodium dioctyl phosphite there is obtained dioctyl 3-(N-piperidino)-propanephosphonate; from N-(3-chloro-2-methylpropyl)-thiamorpholine and sodium diallyl phosphite there is obtained diallyl 3-(N-thiamorpholino)-2-methylpropane- phosphonate; from N-(3-chloro-2-methoxypropyl)-pyrrolidine and sodium dis-s-butyl(S) dithiophosphite there is obtained the product comprising dibutyl 3-(N-pyrrolidino)-2-methoxypropanethiolophosphonate; from sodium diisobutyl phosphite and N-(3-chloropropyl)-2-octadecyltetrahydropyrimidine there is obtained di-isobutyl 3-[N-(2-octadecyltetrahydropyrimidino)] propanephosphonate; from di-isopropyl N-(4-chlorobutyl)-piperidine and sodium di-isopropyl phosphite there is obtained di-isopropyl 4-(N-piperidino)butanephosphonate; from N-(2-chloroethyl)-2,3-dimethylpiperidine and sodium dibutyl phosphite there is obtained dibutyl 2-[N-(2,3-dimethylpiperidino)]ethanephosphonate; from N,N'-bis-(2-chloroethyl)piperazine and sodium di-isopropyl phosphite there is obtained N,N'-bis[2-(di-isopropyl phosphono)ethyl]piperazine; from sodium ethyl benzenephosphonite and N-(2-chloroethyl)-3-ethylpiperidine there is obtained ethyl 2-[N-(3-ethylpiperidino)[-ethane(benzene)phosphonate; and from N-(2-chloroethyl)-2,2,4,6-tetramethylpiperidine and sodium butyl p-methoxybenzenephosphonite there is obtained butyl 2-[N-(2,2,4,6-tetramethylpiperidino)]ethane(benzene)phosphonate.

In the preferred compounds of this invention, the nitrogen heterocyclic ring represented in the general formula by

is a saturated nitrogen-heterocyclic ring having from five to six saturated ring carbon atoms composed of the heteronitrogen atom, from three to five saturated carbon atoms and not more than one atom of an element of the class consisting of nitrogen, oxygen and sulfur. Particularly valuable are the compounds in which the nitrogen-heterocyclic ring is a six-membered saturated ring composed of the nitrogen atom, from four to five saturated carbon atoms, and from one to zero, respectively, atoms of an element of the chalcogen family having an atomic number that is an integral multiple of 8, i. e., oxygen or sulfur. The carbon atoms in the ring may be unsubstituted or they may be substituted by essentially inert, or non-functional groups or atoms, e. g., by alkyl, alkoxy-alkyl, carboalkoxy, aryl, alkylmercaptoalkyl, or like groups, the most highly desirable compounds being those in which the carbon atoms in the nitrogen-heterocyclic ring are unsubstituted and those in which the carbon atoms in the nitrogen-heterocyclic ring bear one or more lower alkyl groups as the only substituents.

The essentially aliphatic hydrocarbon group represented by R is in the preferred compounds of the invention an alkylene group containing from 1 to 10 carbon atoms and most desirably from 2 to 6 carbon atoms. Instead of an unsubstituted alkylene group, the divalent radical represented by R may be an essentially aliphatic hydrocarbon radical, or an alkylene group wherein substitution to a minor extent by non-hydrocarbon substituents and/or by non-aliphatic hydrocarbon substituents that are inert, or non-functional, or that do not detract from the essentially aliphatic hydrocarbon character of the group is not precluded. Thus, instead of an unsubstituted alkylene group, the radical represented by R may be an alkylene group that may be substituted to a minor extent by alkoxy, aryl, alkylmercapto, carboalkoxy, nitro, dialkylamino, and like groups that do not alter the essentially aliphatic hydrocarbon character of the alkylene group. In addition to alkylene groups, such as ethylene, propylene, trimethylene, pentamethylene, beta-methyl-tetramethylene, and the like, R thus may be an inertly substituted alkylene group such as beta-methoxy-trimethylene, beta-phenyl-tetramethylene, gamma-nitro-pentamethylene, etc.

The groups represented by R' preferably are monovalent radicals derived from a monohydric alcohol or phenol having the formula R'OH wherein the hydroxyl radical or group is the only active or functional group, i. e., alcohols or phenols which are devoid of active substituents other than the hydroxyl radical, and preferably such alcohols or phenols containing a total of from 1 to 20 carbon atoms per molecule and most desirably from 1 to 10 carbon atoms per molecule. Illustrative groups that may be represented by R′ are as follows: methyl, ethyl, propyl, isopropyl, 2-methoxyethyl, 3-ethylmercaptopropyl, amyl, 3,5,5-trimethylhexyl, 2-ethylhexyl, isooctyl, dodecyl, phenyl, octadecyl, xylyl, phenethyl, butyl, isobutyl, s-butyl, pentyl, cyclohexyl, allyl, methallyl, 3-chloroallyl, vinyl, and the like, and their various homologs and analogs.

Further compounds that typify the products of this invention and that can be prepared according to the methods hereinbefore disclosed, include, among others, the following: dipropyl 5 - (N - morpholino)pentanephosphonate, di-isobutyl 5-(N-piperidino)-2-ethylpentanephosphonate, diamyl 2-(N-thiamorpholino)ethanephosphonate, dibutyl 2-[N-(2,5-diethylpiperidino)]ethanephosphonate, 2 - [N - (N′ - ethyltetrahydropyrimidino)]-butanephosphonate, di - isopropyl 2 - (N - piperidino)-propanephosphonate, di-2-ethylhexyl 2-(N-piperidino)-ethanephosphonate, di-3,5,5-trimethylhexyl 2-(N-morpholino)ethanephosphonate, dimethyl 2 - [N - (piperazino)]propanephosphonate, dipropyl 2 - [N - (1,3 - oxazino)]ethanephosphonate, dioctyl 2-(N-piperidino)-3-methoxypropanephosphonate, diethyl 3-(N-morpholino)-2-phenylpropanephosphonate, dibutyl 4-[N-(2,5-diethylpiperidino)]butanephosphonate, diphenyl 3-(N-thiamorpholino)propanephosphonate, butyl [2-(N-morpholino)-ethane](benzene)-phosphonate, isopropyl [2-(N-piperidino)ethane](chlorobenzene)-phosphonate, isoamyl [3-(N - piperidino)propane](p - methoxybenzene) - phosphonate, isobutyl [3-(N-morpholino)butane](p-methylbenzene)-phosphonate, allyl [2-(N-piperidino)ethane]-(benzene)phosphonate, isobutyl 4-[N-(2,4,5-trimethylpiperidino)]butane(butane)phosphonate, and di-s-butyl N,N′-[3-(dibutyl phosphono)propyl]-1,3-diazine.

In the present specification and claims, the term "phosphonic acid," unless qualified otherwise, is used to refer inclusively to the primary phosphonic acids and the secondary phosphonic acids, the primary and the secondary phosphonic acids being of the types R—P(O)(OH)$_2$ and R$_2$=P(O)(OH), respectively, wherein R denotes an organic group bonded to the phosphorus atom by a phosporus-to-carbon linkage. The derived term "phosphonate," unless qualified otherwise, is used equivalently.

The compounds of this invention are of particular interest for use as stabilizers for other phosphorus-containing organic compounds, especially esters of other organophosphorus acids, such as esters of hydrocarbon phosphonic acids. To this end they advantageously can be incorporated in hydraulic fluids, synthetic lubricants, greases, and like compositions containing such other phosphorus-containing organic compounds as a principal or major ingredient. Specific illustrations of such other phosphorus-containing organic compounds are dialkyl alkanephosphonates, such as dibutyl n-tetradecanephosphonate, dibutyl n-octanephosphonate; dialkyl aranephosphonates, such as diamyl benzenephosphonate and dioctyl benzenephosphonate; and aromatic esters of phosphonic acids, such as diphenyl benzenephosphonate. The stabilized composition may contain from as little as 0.1% by weight to 10% or more of the compound of this invention. Mixtures of compounds of this invention may, of course, be used as stabilizer instead of a single product.

The stabilizing action of the new compounds of this invention upon other organic compounds of phosphorus may be illustrated by the action of dibutyl 2-(N-morpholino)ethanephosphonate in decreasing the corrosivity and in increasing the oxidation-resistance of "dioctyl 'iso-octene' phosphonate," a commercially available ester of a hydrocarbon phosphonate having a viscosity in the range suitable for hydraulic fluids and light lubricating oils and consisting essentially of bis-2-ethylhexyl 2,4,4-trimethyl-1-pentene-phosphonate. In carrying out the corrosivity measurements, a 20 milliliter sample of the material to be tested was placed in a vertically positioned glass tube within which was vertically suspended a glass inlet tube for introduction of air at a point near the bottom. Accurately weighed washers of the metal to be employed in the test, separated from each other by glass spacers, were fitted over the glass inlet tube and positioned below the surface of the material to be tested. While the tube was heated at 121° C., air was bubbled at a standard rate through the test sample in contact with the metal washers for 71 hours. The washers then were removed, washed in solvent, and re-weighed. The corrosivity of the material tested is measured by the weight loss of the metal specimen, expressed in the following table as milligrams weight loss per square centimeter of metal surface. The results shown in the following table were observed.

TABLE I

Effect of dibutyl 2-(N-morpholino)ethanephosphonate upon the corrosivity of "dioctyl 'iso-octane' phosphonate"

| Amount Added, Weight Percent | Corrosion—Weight loss, mg./cm.$^2$ | | | |
| --- | --- | --- | --- | --- |
| | Copper | Magnesium | Mild Steel | Aluminum |
| 0 | 8.28 | 0.12 | 0.04 | 0.08 |
| 0.5 | 0.12 | 0 | 0 | 0 |

It will be observed that the addition of 0.5% by weight of the dibutyl 2-(N-morpholino)ethanephosphonate to the "dioctyl 'iso-octene' phosphonate" decreased the corrosion of copper to a negligible amount and prevented corrosion of magnesium, mild steel, and aluminum under the conditions of the test.

The effect of the dibutyl 2-(N-morpholino)ethanephosphonate in increasing the resistance of "dioctyl 'iso-octene' phosphonate" to oxidation at elevated temperatures was measured by aerating a sample of the material to be tested at a standard rate of flow of air in the apparatus used for the corrosion test except that the metal washers (and glass spacers) were omitted. Each test was run for 71 hours at 121° C. The resistance towards oxidation was determined by measuring the viscosity and the acidity of the sample before and after aeration. The results shown in the following table were observed, wherein the change in viscosity is expressed as percentage increase in viscosity based upon the initial viscosity, and the change in the acid neutralization number is shown as the number of units by which the acid neutralization number increased.

TABLE II

Effect of dibutyl 2-(N-morpholino)ethanephosphonate upon the oxidation stability of "dioctyl 'iso-octene' phosphonate"

| Amount Added, Weight Percent | Initial Viscosity, Centistokes at 100°F. | Percent increase in Viscosity | Initial Acid Neutralization No. | Increase in Acid Neutralization No.[1], No. of Units |
| --- | --- | --- | --- | --- |
| 0 | 11.91 | 66 | <1.0 | 44.5 |
| 0.5 | 12.53 | 9.5 | <1.0 | 5.5 |
| 1.0 | 12.48 | 7.0 | <1.0 | 3.6 |

[1] Milligrams KOH required to neutralize 1.0 gram of material.

In addition to their utility as stabilizers or inhibitors for other organophosphorus compounds, the new compounds of this invention can be used as additives in hydrocarbon-base lubricating oils and greases, as well as in synthetic lubricants, such as synthetic oils of the poly(alkylene oxide) and the carboxylic ester types, e. g., salicylic, sebacic, azelaic, di(2-ethylhexyl)-sebacate and like esters. The products of this invention are also useful as additives in gasolines, diesel, jet and allied fuels, and they are of potential interest as biologically active materials and as intermediates for the synthesis of biologically active materials, e. g., insecticides, and as plasticizers and as special solvents.

We claim as our invention:

1. As a new compound, an ester of a phosphonic acid, which ester conforms in structure to the formula:

wherein R represents an alkylene group containing not more than ten carbon atoms, R′ represents a hydrocarbon radical containing not more than about twenty carbon atoms, X represents an atom of a non-metallic element of the chalcogen family of the elements, $n$ represents a member of the group consisting of zero and one, and the group

is a saturated nitrogen-heterocyclic ring having from five to six saturated ring atoms composed of the hetero-nitrogen atom, from three to five saturated carbon atoms and not more than one atom of an element of the class consisting of nitrogen, oxygen and sulfur.

2. Dibutyl 2-(N-morpholino)ethanephosphonate.

References Cited in the file of this patent

UNITED STATES PATENTS

| | | |
|---|---|---|
| 2,146,584 | Lipkin | Feb. 7, 1939 |
| 2,160,842 | Dreyfus | June 6, 1939 |
| 2,418,224 | Georges et al. | Apr. 1, 1947 |

OTHER REFERENCES

Kosolapoff, J. Am. Chem. Soc., vol. 69, pp. 2112–13 (1947).

Kosolapoff, J. Am. Chem. Soc., vol. 70, page 1971 (1948).